J. F. ANDRES.
THERMOSTATIC CONTROL FOR ELECTRIC BATTERIES OF AUTOMOBILES, &c.
APPLICATION FILED JAN. 21, 1919.
1,314,629.
Patented Sept. 2, 1919.
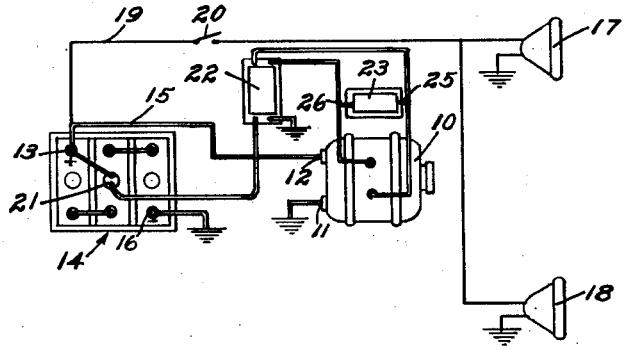
Fig. 1.
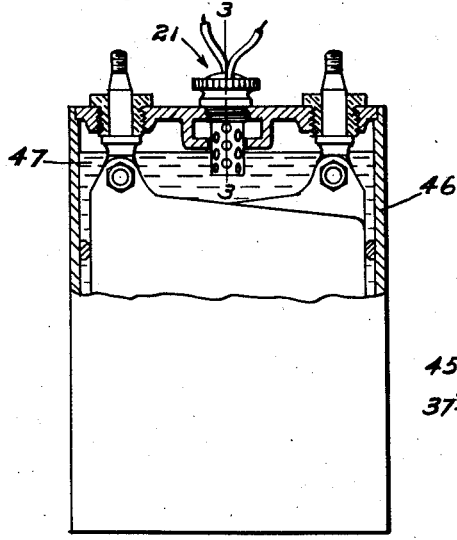
Fig. 2.
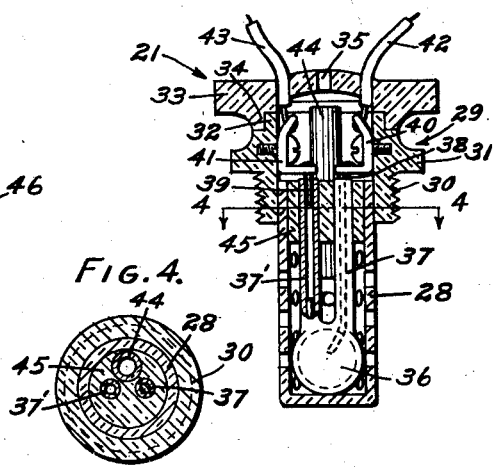
Fig. 3.
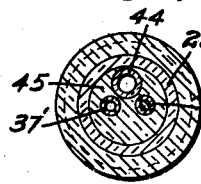
Fig. 4.
Fig. 5.
Fig. 6.
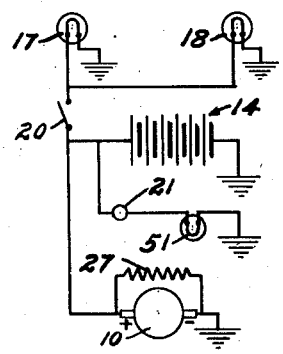
Fig. 7.
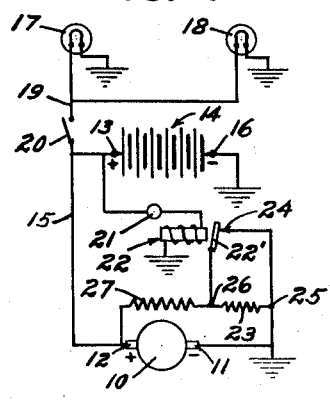
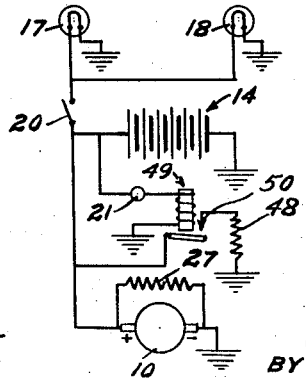
INVENTOR
JOHN F. ANDRES
BY
ATT'YS.

UNITED STATES PATENT OFFICE.

JOHN F. ANDRES, OF LOS ANGELES, CALIFORNIA.

THERMOSTATIC CONTROL FOR ELECTRIC BATTERIES OF AUTOMOBILES, &c.

1,314,629.　　　　　　Specification of Letters Patent.　　Patented Sept. 2, 1919.

Application filed January 21, 1919. Serial No. 272,390.

*To all whom it may concern:*

Be it known that I, JOHN F. ANDRES, a citizen of the United States, residing at Los Angeles, in the county of Los Angeles and State of California, have invented new and useful Improvements in Thermostatic Controls for Electric Batteries of Automobiles, &c., of which the following is a specification.

My invention relates to a thermostatic control for regulating the charging current of storage batteries and which is especially adapted for use with storage batteries employed in automobiles and like vehicles for lighting ignition and starting purposes, such batteries as are charged by a generator connected to the engine shaft of the vehicle so as to be driven continuously when the engine is in motion.

It is a well known fact that storage batteries suffer injury when the temperature of an electrolyte becomes excessive owing to the expansion of the battery plates and the consequent expulsion, cracking and crumbling away of the materials of which the plates are made.

The primary object of my invention is to provide a means for automatically reducing the charging current when the temperature of the storage battery electrolyte has risen to a pre-determined degree, either by introducing additional resistance into the generator field or by short circuiting the generator through a suitable resistance, such means operating automatically to reëstablish normal charging connections when the temperature of the electrolyte falls below said pre-determined degree.

With this and other objects in view which will appear as the description proceeds, my invention consists in the construction, combination and arrangement of parts hereinafter described and claimed.

In the accompanying drawings, which form a part of this specification, Figure 1 is a diagram illustrating the method of connecting a control device embodying the principles of my invention in a simple automobile lighting circuit in which a storage battery and a generator are included.

Fig. 2 is a side view of a storage battery cell equiped with my thermostatic switch, the lower part of the cell being shown in elevation and the upper part being broken away and shown in section to disclose the position of the switch.

Fig. 3 is an enlarged longitudinal sectional view of the thermostatic switch shown in Fig. 2 taken on the line 3—3 of Fig. 2.

Fig. 4 is a transverse sectional view of the thermostatic switch shown in Figs. 2 and 3 taken on the line 4—4 of Fig. 3.

Fig. 5 is a wiring diagram of the apparatus shown in Fig. 1 showing the preferred arrangement and connections.

Fig. 6 is a similar diagram of a modified circuit.

Fig. 7 is a wiring diagram showing a further modified form of circuit.

Referring more particularly to Figs. 1 and 5, the generator 10, which may be mounted to an engine shaft or belted to it so as to be driven continuously by it, has its negative brush 11 grounded to the supporting framework and its positive brush 12 connected with the positive pole 13 of a storage battery 14 by a conductor 15, the negative pole 16 of the battery being grounded to the framework. Headlight lamps 17 and 18 are connected in parallel to the positive pole of the battery by conductor 19, through a switch 20, the other terminal of each being grounded on the framework. This constitutes the usual equipment of a simple lighting system.

The control apparatus includes a thermostatic switch 21 fixed to one of the battery cells, a relay 22 adapted to be mounted on the framework, and a resistance 23 also mounted on the framework and adapted to be connected in the field winding of the generator. The winding of the relay 22 has one terminal connected to the thermostatic switch and the other grounded on the framework. It also has a back contact 24, which is broken when it is energized. The resistance 23 has one terminal 25 connected to the contact 24 and to the grounded side of the generator, while the other terminal 26 is connected to the relay armature 22' and the field winding 27 of the generator. It is therefore evident that the resistance 23 is normally short circuited through relay 22 and is thrown in series with the field winding of the generator by the operation of that relay.

An important part of the control apparatus is the thermostatic switch which is particularly shown in Figs. 2, 3 and 4.

As indicated in Fig. 2, the switch 21 is made in the form of a plug which is adapted to be substituted for the plug usually employed for stopping the filling nipple or opening of the cell. It is made in the form of a casing of a non-corrosive insulating material, such as vulcanite or the like inclosing a double tubed mercury bulb through which conducting wires are led. The casing consists of a perforated tubular portion 28 with a closed lower end and an open upper end. The upper end of this tube fits securely in a sleeve portion 29 which is provided with an externally threaded section 30, a flanged section 31, and a reduced section 32, a cap portion 33 having an annular flange 34 adapted to engage with the reduced section 32 of the sleeve portion, and a central opening 35 serves as a top closure for the plug. The tube, sleeve and cap are securely sealed together when the plug is finished. A bulb 36 containing mercury is placed within the tube 28. It is provided with two tubes 37 and 37' which extend upwardly above the opening of the casing tube 28. A conducting wire 38 is fixed in tube 37 so as to extend downward into the mercury bulb. The other tube 37' is provided with a similar wire conductor 39 which extends slightly within the opening of the tube so as to leave the remainder of the tube open to the flow of mercury from the bulb below. The upper ends of the conducting wires 38 and 39 are secured to terminals 40 and 41 respectively which are attached to the inner wall of the sleeve 29 diametrically opposite to each other. Rubber covered conducting wires 42 and 43 are led through holes provided for them in cap 33 and securely attached to terminals 40 and 41. A ventilating tube 44 of glass or other non-corrosive material extends from approximately the middle of the casing tube 28 upwardly and terminates somewhat below the cap opening 35. This tube and the bulb tubes 37 and 37' are securely held in the casing by an insulating compound 45 which surrounds the upper ends of the bulb tubes and extends downward to the perforations in the casing tube.

The object of the ventilating tube is to provide for allowing gases and vapors produced in the cell to escape through opening 35 in cap 33.

The thermostatic switch thus described is substituted for the filling plug in one of the storage cells 46, preferably the middle cell of the battery. It is adapted to extend far enough through the opening to have its lower end immersed in the electrolyte 47 to such an extent that the mercury bulb 37 is covered by the liquid so that the temperature of the liquid is readily communicated to the mercury in the bulb.

Operation: Under normal conditions the mercury in tube 37' does not make contact with conductor 39, and there is no current through the electrostatic switch, so that the operating conditions are as represented in diagram in Fig. 5. As the temperature of the electrolyte rises, due to the charging of the battery, the mercury in the bulb 36 expands and travels upwardly in tube 37' making contact with conductor 39 where a temperature of 110° F. or any other degree arranged for is reached, whereupon the circuit is closed through the thermostatic switch and the current travels from the positive terminal of the battery through the thermostatic switch 21 to relay 22 and causes contact 24 to be broken. This throws resistance 23 in series with field winding 27, thus weakening the field and cutting down the electromotive force and current of the generator. When the electrolyte cools down contact with conductor 39 is broken, relay 22 is deënergized and normal connections are reëstablished.

In the modified arrangement shown in Fig. 6 a resistance 48 is connected between the positive brush of the generator and ground through a relay 49 having a front contact 50, so that the thermostatic switch operates through the relay to short circuit the generator and battery through this resistance, thus stopping the charging of the battery.

In the modification shown in Fig. 7, the relay and resistance are dispensed with and a signal lamp 51 is placed in series with the thermostatic switch, so that when the temperature of the electrolyte exceeds the predetermined degree the signal lamp 51 automatically lights and signals the driver of the overheated condition of the battery, it being understood that the signal lamp is mounted in a position on the instrument board where it may be seen readily by the driver. The driver may then close switch 20 and deflect the generator current through the lighting system.

Thus I have added a branch line to the line connecting a generator to a battery and placed a thermostatic switch in the battery to close the branch line when the battery becomes overheated from overcharging, and provided means whereby the closing of the branch line will give warning and act as a ground, blow-off or relief for the battery.

While I have shown the preferred construction of my thermostatic switch and control as now known to me, it will be understood that various changes may be made in construction and arrangement of parts by those skilled in the art without departing from the spirit of my invention as claimed.

I claim:

1. The combination with an electrolyte battery, of a thermostatic switch comprising a casing of non-corrosive insulating material and adapted to be screwed into a filling nipple, a second casing consisting of a perforated tubular portion having a closed lower end and an open upper end, the upper end fitting tightly in the first casing, a bulb mounted in the lower part of the second casing, two tubes extending upwardly from the bulb, mercury within the bulb and extending upwardly into the tubes, and conductor wires extending downwardly into the tubes.

2. The combination with an electrolyte battery having a screw threaded filling nipple, of a thermostatic switch adapted to be screwed into the filling nipple and comprising an externally screw threaded bulb formed of non-corrosive insulating material and a perforated tubular casing fixed in the bulb and having a closed lower end, a double tube mercury bulb mounted in the casing, conductor wires connected to the insulating material and extending into the tubes, and mercury in the bulb and extending upwardly into the tubes so that when the electrolyte is heated the mercury will rise in the tubes and electrically connect the ends of the wires.

3. A thermostatic switch comprising a plug having a head formed of non-corrosive insulating material and a casing extending downwardly from the head and having a closed lower end, a double tube mercury bulb mounted in the casing upon the closed lower end, conductor wires connected to the insulating material and having ends extending downwardly into the tubes, and insulating compound fitting around the tubes in the casing and having a ventilating opening.

In testimony whereof I have signed my name to this specification.

JOHN F. ANDRES.